US012687757B2

(12) United States Patent
Harris

(10) Patent No.: US 12,687,757 B2
(45) Date of Patent: Jul. 21, 2026

(54) ELECTRO-OPTIC DISPLAY STACKS WITH SEGMENTED ELECTRODES AND METHODS OF MAKING THE SAME

(71) Applicant: E INK CORPORATION, Billerica, MA (US)

(72) Inventor: George G. Harris, Woburn, MA (US)

(73) Assignee: E INK CORPORATION, Billerica, MA (US)

( * ) Notice: Subject to any disclaimer, the term of this patent is extended or adjusted under 35 U.S.C. 154(b) by 662 days.

(21) Appl. No.: 18/300,824

(22) Filed: Apr. 14, 2023

(65) Prior Publication Data

US 2023/0350263 A1     Nov. 2, 2023

Related U.S. Application Data

(60) Provisional application No. 63/335,507, filed on Apr. 27, 2022.

(51) Int. Cl.
*G02F 1/16755*      (2019.01)
*G02F 1/13*      (2006.01)
         (Continued)

(52) U.S. Cl.
CPC ........ *G02F 1/16755* (2019.01); *G02F 1/1316* (2021.01); *G02F 1/133792* (2021.01);
         (Continued)

(58) Field of Classification Search
CPC ............. G02F 1/1343; G02F 1/136209; G02F 1/1676; G02F 1/16755; G02F 1/1351;
         (Continued)

(56) References Cited

U.S. PATENT DOCUMENTS

| | | | |
|---|---|---|---|
| 4,418,346 A | 11/1983 | Batchelder | |
| 5,456,955 A | 10/1995 | Muggli | |
| | (Continued) | | |

FOREIGN PATENT DOCUMENTS

| | | | |
|---|---|---|---|
| CN | 105353574 A | 2/2016 | |
| CN | 113655670 | * 11/2021 | ........... G02F 1/1533 |
| | (Continued) | | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).
         (Continued)

*Primary Examiner* — Brandi N Thomas
(74) *Attorney, Agent, or Firm* — Quarles & Brady, LLP

(57) ABSTRACT

A method of manufacturing a segmented electro-optic display includes providing an electro-optic display stack including a first substrate layer, a first layer of light-transmissive electrically-conductive material, a layer of electro-optic material, a lamination adhesive, a second layer of light-transmissive electrically-conductive material, and a second substrate layer. The method also includes forming electrically-isolated conductive segments on the second layer of electrically-conductive material using a laser etching process that includes irradiating the second substrate and second electrically-conductive layers at multiple locations with a laser emitting light within a first range of wavelengths. The second substrate layer is transmissive of light within the first range of wavelengths, and the light-transmissive electrically-conductive material is substantially absorptive of light within the first range of wavelengths. At each of the multiple locations, the second substrate layer substantially transmits the light emitted from the laser and
         (Continued)

the light-transmissive electrically-conductive material substantially absorbs the light and is removed.

22 Claims, 5 Drawing Sheets

(51) Int. Cl.

| | |
|---|---|
| G02F 1/1337 | (2006.01) |
| G02F 1/135 | (2006.01) |
| G02F 1/1676 | (2019.01) |
| G02F 1/1677 | (2019.01) |
| H01S 3/16 | (2006.01) |
| H01S 3/223 | (2006.01) |

(52) U.S. Cl.

CPC .......... *G02F 1/1351* (2021.01); *G02F 1/1676* (2019.01); *G02F 1/1677* (2019.01); *H01S 3/1618* (2013.01); *H01S 3/1643* (2013.01); *H01S 3/2232* (2013.01)

(58) Field of Classification Search

CPC ............. G02F 1/133792; G02F 1/1316; G02F 1/1393; G02F 1/133305; H10K 59/122; H10K 59/126; H10K 59/131; H10K 71/851; H10K 2102/103; H10K 59/805; H10K 59/873; H10K 30/81; H10K 50/805; H10K 50/844; H10K 59/80517

See application file for complete search history.

(56) References Cited

U.S. PATENT DOCUMENTS

| | | | |
|---|---|---|---|
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,664,944 | B1 | 12/2003 | Albert et al. |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,704,133 | B2 | 3/2004 | Gates et al. |
| 6,710,540 | B1 | 3/2004 | Albert et al. |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 | 12/2004 | Holman et al. |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,870,661 | B2 | 3/2005 | Pullen et al. |
| 6,900,851 | B2 | 5/2005 | Morrison et al. |
| 6,909,111 | B2 | 6/2005 | Yamagata et al. |
| 6,922,276 | B2 | 7/2005 | Zhang et al. |
| 6,950,200 | B1 | 9/2005 | Yamada et al. |
| 6,950,220 | B2 | 9/2005 | Abramson et al. |
| 6,958,848 | B2 | 10/2005 | Cao et al. |
| 6,967,640 | B2 | 11/2005 | Albert et al. |
| 6,982,178 | B2 | 1/2006 | LeCain et al. |
| 6,987,603 | B2 | 1/2006 | Paolini, Jr. et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,012,735 | B2 | 3/2006 | Honeyman |
| 7,023,430 | B2 | 4/2006 | Liu et al. |
| 7,030,412 | B1 | 4/2006 | Drzaic et al. |
| 7,030,854 | B2 | 4/2006 | Baucom et al. |
| 7,034,783 | B2 | 4/2006 | Gates et al. |
| 7,038,655 | B2 | 5/2006 | Herb et al. |
| 7,061,663 | B2 | 6/2006 | Cao et al. |
| 7,071,913 | B2 | 7/2006 | Albert et al. |
| 7,072,095 | B2 | 7/2006 | Liang et al. |
| 7,075,502 | B1 | 7/2006 | Drzaic et al. |
| 7,075,703 | B2 | 7/2006 | O'Neil et al. |
| 7,079,305 | B2 | 7/2006 | Paolini, Jr. et al. |
| 7,106,296 | B1 | 9/2006 | Jacobson |
| 7,109,968 | B2 | 9/2006 | Albert et al. |
| 7,110,163 | B2 | 9/2006 | Webber et al. |
| 7,110,164 | B2 | 9/2006 | Paolini, Jr. et al. |

(56)          References Cited

U.S. PATENT DOCUMENTS

| | | | |
|---|---|---|---|
| 7,116,318 | B2 | 10/2006 | Amundson et al. |
| 7,116,466 | B2 | 10/2006 | Whitesides et al. |
| 7,119,759 | B2 | 10/2006 | Zehner et al. |
| 7,119,772 | B2 | 10/2006 | Amundson et al. |
| 7,170,670 | B2 | 1/2007 | Webber |
| 7,173,752 | B2 | 2/2007 | Doshi et al. |
| 7,176,880 | B2 | 2/2007 | Amundson et al. |
| 7,190,008 | B2 | 3/2007 | Amundson et al. |
| 7,193,625 | B2 | 3/2007 | Danner et al. |
| 7,202,847 | B2 | 4/2007 | Gates |
| 7,202,991 | B2 | 4/2007 | Zhang et al. |
| 7,206,119 | B2 | 4/2007 | Honeyman et al. |
| 7,223,672 | B2 | 5/2007 | Kazlas et al. |
| 7,230,750 | B2 | 6/2007 | Whitesides et al. |
| 7,230,751 | B2 | 6/2007 | Whitesides et al. |
| 7,236,291 | B2 | 6/2007 | Kaga et al. |
| 7,236,292 | B2 | 6/2007 | LeCain |
| 7,247,379 | B2 | 7/2007 | Pullen et al. |
| 7,256,766 | B2 | 8/2007 | Albert et al. |
| 7,259,744 | B2 | 8/2007 | Arango et al. |
| 7,280,094 | B2 | 10/2007 | Albert |
| 7,312,784 | B2 | 12/2007 | Baucom et al. |
| 7,312,794 | B2 | 12/2007 | Zehner et al. |
| 7,312,916 | B2 | 12/2007 | Pullen et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,365,394 | B2 | 4/2008 | Denis et al. |
| 7,365,733 | B2 | 4/2008 | Duthaler et al. |
| 7,369,299 | B2 | 5/2008 | Sakurai et al. |
| 7,382,363 | B2 | 6/2008 | Albert et al. |
| 7,388,572 | B2 | 6/2008 | Duthaler et al. |
| 7,411,719 | B2 | 8/2008 | Paolini, Jr. et al. |
| 7,420,549 | B2 | 9/2008 | Jacobson et al. |
| 7,492,339 | B2 | 2/2009 | Amundson |
| 7,495,819 | B2 | 2/2009 | Sakurai et al. |
| 7,525,719 | B2 | 4/2009 | Yakushiji et al. |
| 7,528,822 | B2 | 5/2009 | Amundson et al. |
| 7,545,358 | B2 | 6/2009 | Gates et al. |
| 7,561,324 | B2 | 7/2009 | Duthaler et al. |
| 7,602,374 | B2 | 10/2009 | Zehner et al. |
| 7,612,760 | B2 | 11/2009 | Kawai |
| 7,636,191 | B2 | 12/2009 | Duthaler et al. |
| 7,646,530 | B2 | 1/2010 | Takagi et al. |
| 7,649,674 | B2 | 1/2010 | Danner et al. |
| 7,667,684 | B2 | 2/2010 | Jacobson et al. |
| 7,679,599 | B2 | 3/2010 | Kawai |
| 7,688,297 | B2 | 3/2010 | Zehner et al. |
| 7,705,823 | B2 | 4/2010 | Nihei et al. |
| 7,705,824 | B2 | 4/2010 | Baucom et al. |
| 7,715,088 | B2 | 5/2010 | Liang et al. |
| 7,728,811 | B2 | 6/2010 | Albert et al. |
| 7,733,335 | B2 | 6/2010 | Zehner et al. |
| 7,787,169 | B2 | 8/2010 | Abramson et al. |
| 7,839,564 | B2 | 11/2010 | Whitesides et al. |
| 7,893,435 | B2 | 2/2011 | Kazlas et al. |
| 7,952,557 | B2 | 5/2011 | Amundson |
| 7,999,787 | B2 | 8/2011 | Amundson et al. |
| 8,064,962 | B2 | 11/2011 | Wilcox et al. |
| 8,115,729 | B2 | 2/2012 | Danner et al. |
| 8,129,655 | B2 | 3/2012 | Jacobson et al. |
| 8,139,050 | B2 | 3/2012 | Jacobson et al. |
| 8,466,852 | B2 | 6/2013 | Drzaic et al. |
| 8,558,783 | B2 | 10/2013 | Wilcox et al. |

| | | | |
|---|---|---|---|
| 8,928,562 | B2 | 1/2015 | Gates et al. |
| 9,443,878 | B2 | 9/2016 | Matsui et al. |
| 9,897,891 | B2 | 2/2018 | Harris et al. |
| 10,209,602 | B2 | 2/2019 | Harris |
| 10,317,767 | B2 | 6/2019 | Paolini, Jr. et al. |
| 10,503,041 | B2 | 12/2019 | Harris et al. |
| 10,573,222 | B2 | 2/2020 | Paolini, Jr. et al. |
| 10,871,669 | B2 | 12/2020 | Yamazaki et al. |
| 11,030,969 | B2 | 6/2021 | Sainis et al. |
| 11,442,320 | B2 | 9/2022 | Yoshino |
| 2002/0060321 | A1 | 5/2002 | Kazlas et al. |
| 2002/0090980 | A1 | 7/2002 | Wilcox et al. |
| 2003/0102858 | A1 | 6/2003 | Jacobson et al. |
| 2004/0027327 | A1* | 2/2004 | LeCain ........... G02F 1/1675 |
| | | | 345/107 |
| 2004/0105036 | A1 | 6/2004 | Danner et al. |
| 2004/0119681 | A1 | 6/2004 | Albert et al. |
| 2005/0012980 | A1 | 1/2005 | Wilcox et al. |
| 2005/0018273 | A1 | 1/2005 | Honeyman et al. |
| 2005/0122306 | A1 | 6/2005 | Wilcox et al. |
| 2005/0122563 | A1 | 6/2005 | Honeyman et al. |
| 2005/0156340 | A1 | 7/2005 | Valianatos et al. |
| 2005/0253777 | A1 | 11/2005 | Zehner et al. |
| 2006/0087479 | A1 | 4/2006 | Sakurai et al. |
| 2006/0087489 | A1 | 4/2006 | Sakurai et al. |
| 2006/0209008 | A1 | 9/2006 | Nihei et al. |
| 2006/0214906 | A1 | 9/2006 | Kobayashi et al. |
| 2022/0107541 | A1 | 4/2022 | Bouchard |
| 2022/0118480 | A1 | 4/2022 | Giusti et al. |

FOREIGN PATENT DOCUMENTS

| | | | | | |
|---|---|---|---|---|---|
| EP | 1462847 | A1 | 9/2004 | | |
| JP | S59198430 | A | 11/1984 | | |
| JP | S6069686 | A | 4/1985 | | |
| JP | 2007184236 | | * | 7/2007 | .............. H01B 5/14 |
| JP | 2007184236 | A | 7/2007 | | |
| JP | 2008276057 | A | 11/2008 | | |
| JP | 2009192628 | A | 8/2009 | | |
| JP | 2013250405 | A | 12/2013 | | |
| JP | 2014048524 | A | 3/2014 | | |
| WO | 2000005704 | A1 | 2/2000 | | |
| WO | 2000036560 | A1 | 6/2000 | | |
| WO | 2000038000 | A1 | 6/2000 | | |
| WO | 2000067110 | A1 | 11/2000 | | |
| WO | 2004079442 | A1 | 9/2004 | | |

OTHER PUBLICATIONS

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 345-348, (Jun. 5, 2002).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Hayes, R.A. et al., "Video-Speed Electronic Paper Based on Electrowetting", Nature, vol. 425, No. 25, pp. 383-385 (Sep. 2003).

European Patent Office, "International Search Report and Written Opinion", PCT/US2023/018620, Jun. 19, 2023.

* cited by examiner

ELECTRO-OPTIC DISPLAY STACKS WITH SEGMENTED ELECTRODES AND METHODS OF MAKING THE SAME

CROSS-REFERENCE TO RELATED APPLICATIONS

This application claims priority to U.S. Provisional Patent Application No. 63/335,507 filed on Apr. 27, 2022, the entire contents of which are incorporated herein by reference. Further, the entire contents of any patent, published application, or other published work referenced herein are incorporated by reference in their entireties.

BACKGROUND OF THE INVENTION

The present invention relates to an electro-optic display stack having segmented electrodes, and finished electro-optic displays formed from the same. This invention also provides processes for the production of such electro-optic display stacks. This invention is particularly, but not exclusively, intended for use with displays comprising encapsulated electrophoretic media. However, the invention can also make use of various other types of electro-optic media which are "solid" in the sense that they have solid external surfaces, although the media may, and often do, have internal cavities which contain a fluid (either liquid or gas). Such "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Patent Application Publication No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball"

display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Application Publication No. 2005/0001810; European Patent Applications 1,462,847; 1,482,354; 1,484, 635; 1,500,971; 1,501,194; 1,536,271; 1,542,067; 1,577, 702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; 6,545,291; 6,580,545; 6,639,578; 6,652, 075; 6,657,772; 6,664,944; 6,680,725; 6,683,333; 6,704, 133; 6,710,540; 6,721,083; 6,724,519; 6,727,881; 6,738, 050; 6,750,473; 6,753,999; 6,816,147; 6,819,471; 6,822, 782; 6,825,068; 6,825,829; 6,825,970; 6,831,769; 6,839, 158; 6,842,167; 6,842,279; 6,842,657; 6,864,875; 6,865, 010; 6,866,760; 6,870,661; 6,900,851; 6,922,276; 6,950, 200; 6,958,848; 6,967,640; 6,982,178; 6,987,603; 6,995, 550; 7,002,728; 7,012,600; 7,012,735; 7,023,430; 7,030, 412; 7,030,854; 7,034,783; 7,038,655; 7,061,663; 7,071, 913; 7,075,502; 7,075,703; 7,079,305; 7,106,296; 7,109, 968; 7,110,163; 7,110,164; 7,116,318; 7,116,466; 7,119,759; and 7,119,772; and U.S. Patent Application Publication Nos. 2002/0060321; 2002/0090980; 2002/0180687; 2003/ 0011560; 2003/0102858; 2003/0151702; 2003/0222315; 2004/0014265; 2004/0075634; 2004/0094422; 2004/ 0105036; 2004/0112750; 2004/0119681; 2004/0136048; 2004/0155857; 2004/0180476; 2004/0190114; 2004/ 0196215; 2004/0226820; 2004/0239614; 2004/0257635; 2004/0263947; 2005/0000813; 2005/0007336; 2005/ 0012980; 2005/0017944; 2005/0018273; 2005/0024353; 2005/0062714; 2005/0067656; 2005/0078099; 2005/ 0099672; 2005/0122284; 2005/0122306; 2005/0122563; 2005/0122565; 2005/0134554; 2005/0146774; 2005/ 0151709; 2005/0152018; 2005/0152022; 2005/0156340; 2005/0168799; 2005/0179642; 2005/0190137; 2005/ 0212747; 2005/0213191; 2005/0219184; 2005/0253777; 2005/0270261; 2005/0280626; 2006/0007527; 2006/ 0024437; 2006/0038772; 2006/0139308; 2006/0139310; 2006/0139311; 2006/0176267; 2006/0181492; 2006/ 0181504; 2006/0194619; 2006/0197736; 2006/0197737; 2006/0197738; 2006/0198014; 2006/0202949; and 2006/ 0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Other types of electro-optic materials may also be used in the present invention. Of particular interest, bistable ferroelectric liquid crystal displays (FLCs) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 6,172,798, 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, many of the components used in solid electro-optic displays, and the methods used to manufacture such displays, are derived from technology used in liquid crystal displays (LCDs), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCDs. However, the methods used for assembling LCDs cannot be used with solid electro-optic displays. LCDs are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDAs), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. This patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sand-wiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned U.S. Pat. No. 7,839,564 also describes various methods designed for high volume manufacture of electro-optic displays using inverted front plane laminates. Some forms of these methods are "multi-up" methods designed to allow lamination of components for a plurality of electro-optic displays at one time.

The aforementioned U.S. Pat. No. 6,982,178 also describes the importance of protecting the electro-optic medium from environmental contaminants, since some electro-optic media are sensitive to humidity and ultra-violet radiation, and most such media are susceptible to mechanical damage. This patent illustrates, in FIG. 10, a process in which a protective film is laminated over a front plane laminate in the same lamination operation by which the front plane laminate is laminated to a backplane; such a protective film can protect the electro-optic medium against ingress of moisture, other liquids, and some gases. However, even with such a protective film, the edge of the electro-optic medium is still exposed to the environment, and this patent teaches that it is also advisable for the display to include an edge seal, which serves to prevent the ingress of moisture and other contaminants around the outer edges of the display. Various types of edge seal are illustrated in FIGS. 11-17 of this patent. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Three-bond 30Y-491 material (from Threebond Corporation, Cincinnati, OH) has been found to have favorable water vapor barrier properties, low viscosity at elevated temperature for easy dispensing of the edge seal material, good wetting characteristics, and manageable curing properties. Those skilled in the art and familiar with advanced sealants will be able to identify other sealants that offer comparable performance.

SUMMARY OF THE INVENTION

As described in several of the aforementioned MIT and E Ink patents and applications, in a conventional assembly process, the FPL can be cut from a larger sheet of material or from a roll of material formed in a roll-to-roll process. Laser cutting or die cutting can be used to separate a continuous web or sheet of FPL into pieces of appropriate sizes for lamination to individual backplanes. The cutting process may result in the formation of debris, for example, from ruptured capsules of an encapsulated electrophoretic medium, and it is therefore necessary to mechanically or chemically remove ("clean") the residue after cutting.

Laser cutting can also be used to expose areas for electrical connections to the backplane by "kiss cutting" the FPL with a laser to remove portions of the light-transmissive electrically-conductive layer, and if present, the protective or barrier layer, the release sheet, and any intervening adhesive layers. Following the kiss cutting it is again necessary to clean the residue of the electro-optic and/or adhesive layers in order to ensure an electrical connection to the backplane will be exposed upon lamination of the FPL to the backplane. In practice, it is necessary to inspect each FPL piece after the cleaning step is completed and before the FPL piece is laminated to a backplane.

Assembly of a conventional electro-optic display stack then typically includes lamination of the FPL to a backplane containing a preformed array of pixel electrodes and a number of conductors for connecting the pixel electrodes to drive circuitry. (Top and bottom protective or barrier layers are typically applied to the FPL and backplane, respectively, in separate lamination operations either before or after lamination of the FPL to the backplane.)

It has been observed that the optical performance of the resulting display can be negatively impacted if the environmental conditions under which lamination of the FPL and backplane (both separately and to each other) are not maintained within a particular range during the lamination process. As one example, in the case of encapsulated electrophoretic displays, the conductivity of the capsule walls can be significantly affected by moisture. It is therefore recommended that the lamination be effected at 20 to 60 percent relative humidity, and optimally at approximately 50 percent relative humidity. Also, for such electrophoretic displays, the lamination process is preferably carried out at about room temperature (e.g., in the range of 15 to 25° C.). In addition to manufacturing the display stack components in a controlled environment, prior to any lamination operations the FPL and/or the backplane often must be conditioned in an environmental chamber at the desired temperature and relative humidity for several hours or even days in order to reach relative humidity equilibrium.

Further, even if a protective or barrier film has been laminated to the FPL, it has been observed that electro-optic displays incorporating these films typically have adequate moisture diffusion protection at the surface of the display, but relatively weak moisture diffusion protection at the outer edges of the layer of electro-optic medium. As previously noted, many electro-optic media are susceptible to environmental factors, such as moisture, oxygen, and particulates. Accordingly, many displays incorporate edge seals such as those described in U.S. Pat. Nos. 6,982,178, 7,110,164, and 7,649,674 and Patent Publication No. 2004/0155857 to prevent adverse effects to the electro-optic medium caused by such environmental factors, thus increasing the operating life of the display. In addition, the lamination process is desirably carried out in a clean room environment with a low particle count to improve manufacturing yields.

From the foregoing, it can be understood that conventional techniques for assembling electro-optic display stacks require several discrete processing steps for each component, and many of the steps must be performed serially such that completion of certain steps gates performance of any subsequent steps. For example, the kiss cutting and cleaning process described above must be performed before the FPL is laminated to the backplane. In addition, the location and geometry of the connections on the backplane must be known in advance of the lamination process in order to know where to make the cuts in the FPL.

Further, it is common for the FPL to be manufactured at a different facility or location than the backplane, and under different environmental conditions. Accordingly, conditioning in an environmental chamber is required prior to lamination of the FPL to the backplane. However, conditioning is an energy-intensive process, and in some cases, the FPL or backplane may have already been through a conditioning process when being assembled. In addition, as discussed above, conditioning is also a time-consuming process and can take days to complete, resulting in increased manufacturing time.

In addition, each time the individual components are taken out of a clean room environment, for example, to be packed and shipped to different manufacturing sites, there is more of an opportunity for the ingress of water vapor and other environmental contaminants which can adversely affect the electro-optic properties and operating lifetime of the display. A larger area around the edges of a particular sheet of FPL can also become unusable if there are long time delays between fabrication of the FPL and final assembly of a finished electro-optic display (including lamination to a backplane and application of edge seals around the perimeter of the display), thereby decreasing production yields. For example, edge seals are often formed using a curable resin that is not easily removed. Therefore, the edges of the FPL can be left exposed until the FPL has been laminated to a backplane.

There is therefore a need for improved processes for the production of electro-optic display stacks. Accordingly, the inventive electro-optic display stacks and processes described herein include features for addressing the deficiencies of conventional electro-optic display stacks and their corresponding production processes.

Thus, in one aspect, the invention includes a method of manufacturing a segmented electro-optic display. The method includes providing an electro-optic display stack. The electro-optic display stack includes a first substrate layer, a first layer of light-transmissive electrically-conductive material, a layer of an electro-optic material, a lamination adhesive layer, a second layer of light-transmissive electrically-conductive material, and a second substrate layer. The method also includes forming a plurality of electrically-isolated conductive segments on the second layer of light-transmissive electrically-conductive material using a laser etching process. The laser etching process includes irradiating the second substrate layer and the second layer of light-transmissive electrically-conductive material at a first plurality of locations with a laser emitting light within a first range of wavelengths. The second substrate layer is substantially transmissive of light within the first range of wavelengths, and the light-transmissive electrically-conductive material of the second layer of light-transmissive electrically-conductive material is substantially absorptive of light within the first range of wavelengths. At each of the first plurality of locations, the second substrate layer substantially transmits the light within the first range of wavelengths, and the light-transmissive electrically-conductive material of the second layer of light-transmissive electrically-conductive material substantially absorbs the light within the first range of wavelengths and is removed.

In another aspect, the invention includes a segmented electro-optic display formed using the methods described herein.

In some embodiments, the electro-optic display stack further includes a first barrier layer, a first adhesive layer, a second adhesive layer, and a second barrier layer. In some embodiments, the laser etching process further includes irradiating the second adhesive layer and the second barrier layer at the first plurality of locations with the laser emitting light within the first range of wavelengths, where the second adhesive layer and the second barrier layer are substantially transmissive of light within the first range of wavelengths, and at each of the plurality of locations, the second adhesive layer and the second barrier layer substantially transmit the light within the first range of wavelengths.

In some embodiments, the method further includes irradiating the first barrier layer, the first adhesive layer, the first substrate layer, and the first layer of light-transmissive electrically-conductive material at a second plurality of locations with a laser emitting light within a second range of wavelengths, where the first barrier layer, the first adhesive layer, the first substrate layer, and the light-transmissive electrically-conductive material of the first layer of light-transmissive electrically-conductive material are substantially absorptive of light within the second range of wavelengths, and at each of the second plurality of locations, the first barrier layer, the first adhesive layer, the first substrate layer and the light-transmissive electrically-conductive material of the first layer of light-transmissive electrically-conductive material substantially absorb the light within the second range of wavelengths and are removed. In some embodiments, the method further includes removing a plurality of volumes of the layer of an electro-optic material and the lamination adhesive layer adjacent to each of the second plurality of locations.

In some embodiments, the method further includes irradiating the second barrier layer, the second adhesive layer, and the second substrate layer and the second layer of light-transmissive electrically-conductive material at a third plurality of locations with a laser emitting light within a third range of wavelengths, where the second barrier layer, the second adhesive layer, and the second substrate layer and the light-transmissive electrically-conductive material of the second layer of light-transmissive electrically-conductive material are substantially absorptive of light within the third range of wavelengths, and at each of the third plurality of locations, the second barrier layer, the second adhesive layer, and the second substrate layer and the light-transmissive electrically-conductive material of the second layer of light-transmissive electrically-conductive material substantially absorb the light within the third range of wavelengths and are removed. In some embodiments, the method further includes removing a plurality of volumes of the layer of an electro-optic material and the lamination adhesive layer adjacent to each of the third plurality of locations.

In some embodiments, the method further includes forming a plurality of electrically-isolated conductive segments on the first layer of light-transmissive electrically-conductive material using a second laser etching process. The second laser etching process includes irradiating the first substrate layer and the first layer of light-transmissive electrically-conductive material at a fourth plurality of locations with a laser emitting light within a fourth range of wavelengths, where the first substrate layer is substantially transmissive of light within the fourth range of wavelengths, and the light-transmissive electrically-conductive material of the first layer of light-transmissive electrically-conductive material is substantially absorptive of light within the fourth range of wavelengths. Further, at each location, the first substrate layer substantially transmits the light within the first range of wavelengths, and the light-transmissive electrically-conductive material of the first layer of light-transmissive electrically-conductive material substantially absorbs the light within the fourth range of wavelengths and is removed.

In some embodiments, the electro-optic display stack further includes a first barrier layer and a first adhesive layer. In some embodiments, the second laser etching process further includes irradiating the first adhesive layer and the first barrier layer at the plurality of locations with the laser emitting light within the fourth range of wavelengths, where the first adhesive layer and the first barrier layer are substantially transmissive of light within the fourth range of wavelengths, and at each of the plurality of locations, the first adhesive layer and the first barrier layer substantially transmit the light within the fourth range of wavelengths.

In some embodiments, the method further includes irradiating the electro-optic display stack at a fifth plurality of locations with a laser emitting light within a fifth range of wavelengths, where each layer of the electro-optic display stack is substantially absorptive of light within the fifth range of wavelengths, and at each of the fifth plurality of locations, the layers of the electro-optic display stack substantially absorb the light within the fifth range of wavelengths and are removed.

In some embodiments of the method, the first range of wavelengths is between 940 nm and 1440 nm. In some embodiments, the second range of wavelengths is between 9000 nm and 12000 nm. In some embodiments, the third range of wavelengths is between 9000 nm and 12000 nm. In some embodiments, the fourth range of wavelengths is between 940 nm and 1440 nm. In some embodiments, the fifth range of wavelengths is between 9000 nm and 12000 nm.

In some embodiments, the second barrier layer, the second adhesive layer, and the second substrate layer are 85% or more transmissive of light within the first range of wavelengths. In some embodiments, the light-transmissive electrically-conductive material of the second layer of light-transmissive electrically-conductive material is 80% or less transmissive of light within the first range of wavelengths.

In some embodiments, the light within the first range of wavelengths breaks the light-transmissive electrically-conductive material of the second layer of light-transmissive electrically-conductive material into discontinuous pieces at each of the plurality of locations. In some embodiments, the light within the first range of wavelengths oxidizes the light-transmissive electrically-conductive material of the second layer of light-transmissive electrically-conductive material into discontinuous pieces at each of the plurality of locations. In some embodiments, the laser emitting light in the first range of wavelengths is a YAG or Ytterbium doped fiber laser. In some embodiments, the laser emitting light in the second range of wavelengths is a $CO_2$ laser. In some embodiments, the plurality of volumes of the layer of an electro-optic material and the lamination adhesive layer are removed using deionized water and isopropanol.

BRIEF DESCRIPTION OF DRAWINGS

Additional details of one or more embodiments of the subject matter described in this specification are set forth in the accompanying drawings and the description below. Other features, aspects, and advantages of the subject matter will become apparent from the descriptions contained herein and the accompanying drawings. It should be stressed that the accompanying drawings are schematic and not to scale. In particular, for ease of illustration, the thicknesses of the various layers in the drawings do not correspond to their actual thicknesses. Also, the thicknesses of the various layers are out of scale relative to their lateral dimensions. Generally, elements of similar structures are annotated with like reference numerals for illustrative purposes throughout the drawings. However, the specific properties and functions of elements in different embodiments may not be identical. Further, the drawings are only intended to facilitate the description of the subject matter. The drawings do not illustrate every aspect of the described embodiments and do not limit the scope of the present disclosure or claims.

DETAILED DESCRIPTION OF THE INVENTION

Figure 1:
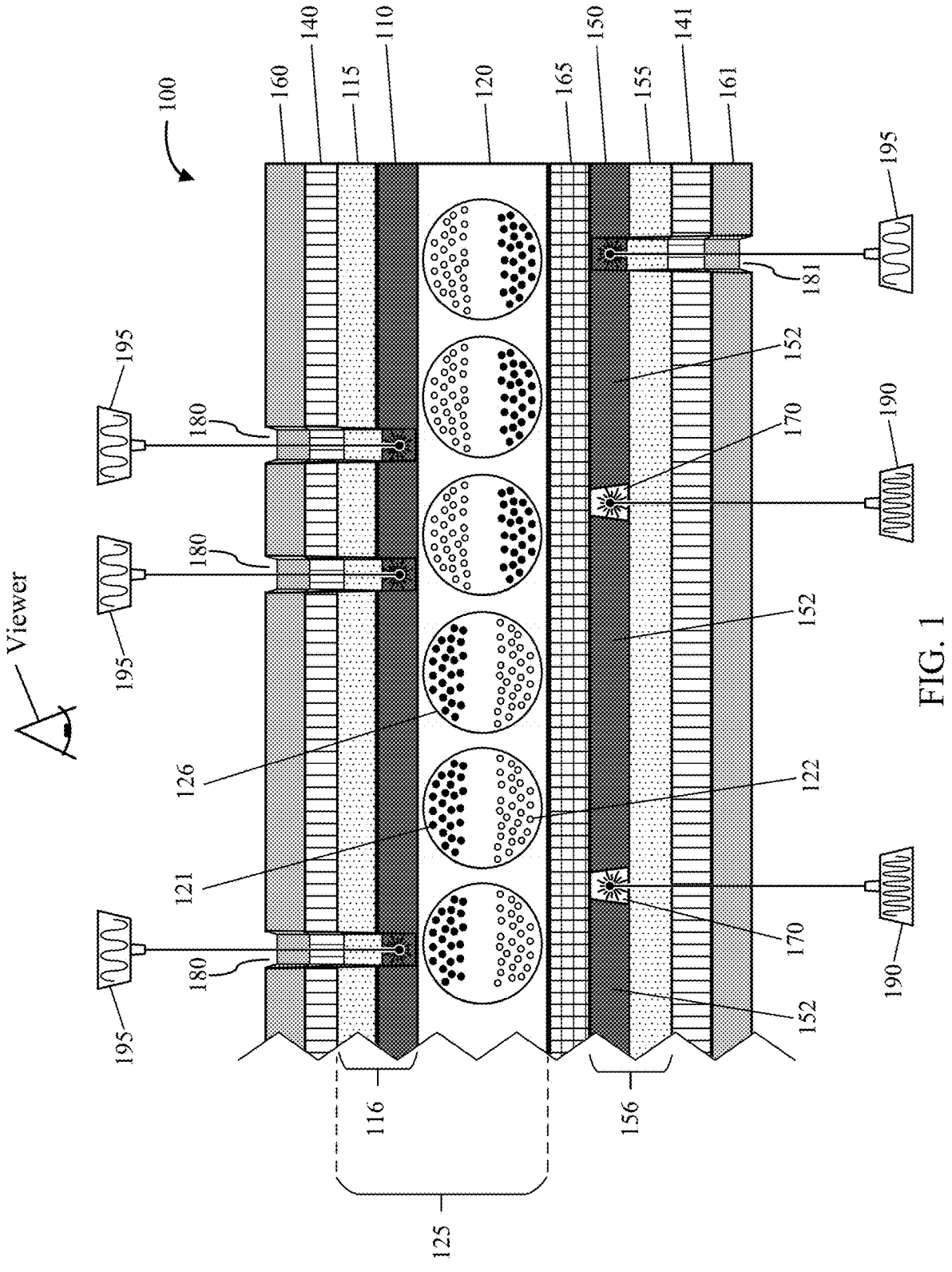
FIG. 1 is a cutaway view of a schematic cross-section showing an exemplary embodiment illustrating segmenting and kiss cutting operations performed on a segmented electro-optic display stack in accordance with the subject matter presented herein.

Segmented electro-optic displays, especially those using encapsulated electrophoretic media, present important new marketing opportunities, for example, large displays which can be stored in a compact form may be useful as additional display devices on electronic devices which are presently equipped only with a small display screen but where a larger display screen would often be useful. Examples of such devices include cellular telephones equipped to receive electronic mail. However, conventional electro-optic displays are often assembled from components that are manufactured in different facilities under different environmental conditions. This provides more of an opportunity for the display stack components to become subject to ingress of water vapor, dust, and other environmental contaminants which can adversely affect the electro-optic properties and operating lifetime of the display. Further, conventional assembly techniques do not allow for mass production of a full display stack because they require the backplane to be segmented into electrodes prior to being laminated to an FPL. Several techniques are discussed below for overcoming the deficiencies of conventional display stacks and their corresponding assembly techniques.

For the purpose of subsequent discussion, the term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane). If one or more additional barrier layers need to be added to the backplane to reduce ingress of moisture and other contaminants, the barrier layers should be located as closely as possible to the electro-optic layer so that little or no edge profile of low barrier material is present between the front (discussed below) and rear barrier layers.

The term "front substrate" is used herein consistent with its conventional meaning in the art of electro-optic displays and in the aforementioned patents and published applications, to mean a rigid or flexible material that is light-transmissive (and preferably transparent). The front substrate will typically comprise at least one electrode, most commonly a single continuous front electrode extending across the entire display. Typically, the exposed surface of the front substrate will form the viewing surface through which an observer views the display, although, as in some of the embodiments described below, there may be additional layers interposed between the front substrate and the viewing surface. As with the backplane, the front substrate needs to provide sufficient barrier properties to prevent ingress of moisture and other contaminants through the viewing side of the display.

Typically, an electro-optic display includes one or more barrier layers to prevent ingress of moisture, dirt, gasses, etc., or to prevent exit of fluids within the display. If one or more additional layers need to be added to the front substrate to reduce ingress of moisture and other contaminants, the barrier layers should be located as closely as possible to the electro-optic layer so that when the barrier layer drapes over the display there is little or no edge profile with respect to the back substrate.

As discussed in the aforementioned U.S. Pat. Nos. 7,649,674, 6,982,178 and 7,110,164 and Patent Publication No 2004/0155857, a common front substrate for electro-optic displays comprises a thin layer of ITO on PET, such coated films being readily available commercially, e.g., from Saint Gobain. In such a front substrate, the ITO layer serves as a barrier material, but in practice inevitably suffers from pinholes and cracks, through which moisture and other contaminants can penetrate to the electro-optic material. To increase the sealing properties of such a PET/ITO or similar front substrate, it is desirable to laminate a redundant barrier layer on to the front substrate, this redundant barrier layer being formed of a homopolymer (for example, polychlorotrifluoroethylene, available from Honeywell Corporation under the Registered Trade Mark "ACLAR"), or a sputtered ceramic (for example $AlO_x$, available from Toppan Printing Company under the trade name Toppan GX Film). In other embodiments, flexible glass, such as WILLOW® brand glass from Corning can be used. The redundant barrier layer should be thin to provide a flexible display, ideally about 12 μm, but could be as thick as 5 mil (127 μm) if sufficient flexibility is still available. Where an adhesive layer is required to attach the redundant barrier to the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives. Suitable optically-clear adhesives are commercially available from Norland Adhesives.

Alternatively, the barrier properties of a PET/ITO or similar front substrate may be improved by coating a redundant metal oxide layer (for example, an alumina or zinc oxide layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., 3047 Orchard Parkway, San Jose, CA 95134 could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 μm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (sold under the Registered Trade Mark "SARAN"), polychlorotrifluoroethylene (sold under the Registered Trade Marks "ACLAR" and "CLARIS"), triacetyl cellulose, the material sold under the Registered Trade Mark "ARTON" by JSR Company, polyethersulfone (PES) and laminates of two or more of these materials. Suitable transparent conductive materials include ITO, organic conductive polymers such as Baytron P (Registered Trade Mark), carbon nanotubes, and other suitably conducting light transmissive conductors (transmission greater than 60 percent) having resistivities of less an about $10^4$ ohms/square.

Exemplary embodiments of electro-optic display stacks according to the present invention will now be described, by way of illustration only, with reference to the accompanying drawings. In all cases, the electro-optic layer may be an encapsulated electrophoretic layer, a polymer-dispersed electrophoretic layer, or any of the other types of electro-optic layer discussed above. The display stack may contain one or two lamination adhesive layers to attach the electro-optic material to the front substrate and/or the backplane. The display stack may be viewed through either lamination adhesive layer, and may be assembled by direct coating and lamination, or by the use of front plane laminates, inverted front plane laminates, or double release films, as described in the patents and applications mentioned in the "Cross-Reference to Related Applications" Section hereof. Although as mentioned above, the final display is normally viewed through the front substrate, in some cases a light-transmissive backplane can be used to provide a double-sided display, or one operating in the aforementioned shutter mode. Such constructions may be used in variable transmission films, whereby the amount of light transmitted through the film can be altered electronically. In all the accompanying drawings, the electro-optic display stacks are illustrated with the viewing surface (alternatively called the front surface) at the top, so that references hereinafter to front and rear or top and bottom surfaces refer to upper and lower surfaces respectively as illustrated in the relevant drawings.

FIG. 1 of the accompanying drawings is a cutaway view of a schematic cross-section showing an exemplary embodiment of a segmented electro-optic display stack 100 in accordance with the subject matter presented herein.

Electro-optic display stack 100 typically includes a transparent top substrate 115, a transparent top electrically-conductive layer 110, and a layer of electrophoretic medium 120. The top electrically-conductive layer 110 is typically carried on or formed on the top substrate 115. For example, the top electrically-conductive layer 110 can be a continuous layer of ITO coated on the top substrate 115, which can be a polymeric film such as PET. The top electrically-conductive layer 110 and top substrate 115 together are referred to as the top electrode 116.

The electrophoretic medium 120 contains electrophoretic particle 121 and electrophoretic particle 122. Electrophoretic particle 121 and 122 may have different electrical charges and different optical characteristics. For example, electrophoretic particle 121 may be black and have a positive charge while electrophoretic particle 122 may be white and have a negative charge. However, in some embodiment, the electrophoretic medium 120 includes just a single type of electrophoretic particle, or three or more electrophoretic particles, each possibly having different optical, electro-optical, or chemical properties. The electrophoretic medium 120 typically includes a non-polar solvent, such as isoparaffins, and may also include dispersed polymers and charge control agents to facilitate state stability, e.g. bistability, i.e., the ability to maintain an electro-optic state without inputting any additional energy.

The electrophoretic medium 120 shown in FIG. 1 is compartmentalized by a plurality of microcapsules 126. However, in some embodiments, the electrophoretic medium 120 is compartmentalized by the walls of a plurality of microcells (not shown in FIG. 1). The structure made up of the top electrode 116 and the layer of electrophoretic medium 120 (together referred to as FPL 125) is typically disposed on to a second layer of light-transmissive electrically-conductive material carried on or formed on a second substrate layer, respectively identified as bottom electrically-conductive layer 150 and bottom substrate 155 in FIG. 1. The bottom electrically-conductive layer 150 and bottom substrate 155 together are referred to as the bottom electrode 156. The FPL 125 is typically laminated to the bottom electrode 156 using a lamination adhesive layer 165.

In some embodiments, the bottom electrically-conductive layer 150 is fabricated as a single continuous conductor formed from the same or similar light-transmissive materials as the top electrically-conductive layer 110, and the bottom substrate 155 is formed from the same or similar light-transmissive materials as the top substrate 115. In some embodiments, the bottom electrically-conductive layer 150 is formed from a carbon-paste or a metal foil (not shown).

Electro-optic display stack 100 can also include a top protective or barrier layer 160 for protecting the top electrode 116 from damage, and a bottom protective or barrier layer 161 for protecting the bottom electrode 156 from damage. Electro-optic display stack 100 can also include an adhesive layer 140 between the top electrode 116 and the top barrier layer 160, and adhesive layer 141 between the bottom electrode 156 and the bottom barrier layer 161.

Although not shown in FIG. 1, electro-optic display stack 100 can include one or more additional adhesive layers as needed (e.g., between the top electrode 116 and the layer of electrophoretic medium 120, between the layer of electrophoretic medium 120 and the bottom electrode 156). In some embodiments the adhesive layers can include an integrated primer component to improve adhesion, or a separate primer layer (not shown in FIG. 1) can be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.) In some embodiments, the top and bottom barrier layers (160, 161) are fabricated to include an integral adhesive material or layer on at least one surface.

In some embodiments, manufacturing a segmented electro-optic display includes providing an electro-optic display stack. The display stack can include a first substrate layer such as transparent top substrate 115, a first layer of light-transmissive electrically-conductive material such as transparent top electrically-conductive layer 110, and a layer of an electro-optic material such as layer of electrophoretic medium 120. The display stack can also include a lamination adhesive layer such as lamination adhesive layer 165, a second layer of light-transmissive electrically-conductive material such as bottom electrically-conductive layer 150, and a second substrate layer such as bottom substrate 155. As indicated above, the bottom electrically-conductive layer 150 can be fabricated as a single continuous conductor.

Once the layers described above have been fabricated and assembled together to form an electro-optic display stack, a laser etching process can be used to form a plurality of electrically-isolated conductive segments on the second layer of light-transmissive electrically-conductive material. The laser etching process can include irradiating the second substrate layer and the second layer of light-transmissive electrically-conductive material at a plurality of locations with a laser emitting light within a first range of wavelengths. For example, a segmenting laser 190 that emits light within a first range of wavelengths is used in an etching process that segments the bottom electrically-conductive layer 150 into an array or plurality of electrically-isolated conductive segments, identified as segmented pixel electrodes 152 in FIG. 1.

This technique is enabled by the use of a segmenting laser that emits light within a range of wavelengths that pass through the bottom substrate 155, but are absorbed by the electrically-conductive material of bottom electrically-conductive layer 150. The segmenting laser 190 irradiates the bottom substrate 155 and the bottom electrically-conductive layer 150. The bottom substrate 155 is substantially transmissive of light within the first range of wavelengths, and the light emitted from the segmenting laser 190 passes through it, leaving the bottom substrate 155 substantially intact. Conversely, the bottom electrically-conductive layer 150 is substantially absorptive of light within the first range of wavelengths, and is therefore etched or cut by the segmenting laser 190, leaving an electrically-isolating void or cut 170 at each of the locations at which the segmenting laser 190 is focused.

In some embodiments, the electro-optic display stack also includes a first barrier layer such as top barrier layer 160, a first adhesive layer such as adhesive layer 140, a second adhesive layer such as adhesive layer 141, and a second barrier layer such as bottom barrier layer 161.

For this configuration of the display stack, the segmenting laser emits light within a range of wavelengths that pass through the bottom barrier layer 161, adhesive layer 141, and bottom substrate 155, but are absorbed by the electrically-conductive material of bottom electrically-conductive layer 150. The segmenting laser 190 irradiates the bottom barrier layer 161, adhesive layer 141, bottom substrate 155, and the bottom electrically-conductive layer 150. Of these layers, the bottom barrier layer 161, adhesive layer 141, and bottom substrate 155 are substantially transmissive of light within the first range of wavelengths. As illustrated in FIG. 1, the light from the segmenting laser 190 passes through the bottom barrier layer 161, adhesive layer 141, and bottom substrate 155, leaving these layers substantially intact. Only the bottom electrically-conductive layer 150 is substantially absorptive of light within the first range of wavelengths, and is therefore etched or cut by the segmenting laser 190, leaving an electrically-isolating void or cut 170 at the locations at which the segmenting laser 190 is focused.

In some embodiments, the segmenting laser 190 emits light with a typical wavelength within the near-infrared (NIR) spectrum. In some embodiments, the segmenting laser 190 is a neodymium-doped yttrium aluminum garnet (Nd: YAG) or Ytterbium doped fiber laser that emits light with a typical wavelength between about 940 nm and about 1440 nm. In some embodiments, the segmenting laser 190 has an average output power of between about 10 W and about 100 W. In such embodiments, the bottom barrier layer 161, adhesive layer 141, and bottom substrate 155 are formed from materials that are substantially transparent to light at those wavelengths, and the electrically-conductive material of the bottom electrically-conductive layer 150 substantially absorbs light at those wavelengths. As such, the segmenting laser 190 can be operated at an average power sufficient to cut the electrically-conductive material of bottom electrically-conductive layer 150 without cutting the bottom barrier layer 161, adhesive layer 141, or bottom substrate 155. Advantageously, this enables the bottom electrically-conductive layer 150 to be partitioned into any number of electrically-isolated segments without damaging the display stack's mechanical, optical, or barrier performance. Further, using a segmenting laser 190 that emits light having a wavelength that is not visible to the human eye (e.g., NIR spectrum) enables the optical properties of the display stack materials to be independent of the processing properties of those materials.

In one example, the segmenting laser 190 is a part of a Speedy Flexx 400 laser system from Trotec Laser GmbH that incorporates an Ytterbium doped fiber laser that has an average output power of 20 W and emits light with a typical wavelength centered approximately about 1064 nm. Further, the bottom barrier layer 161 is formed as a sputtered aluminosilicate barrier film, which is approximately 92% transmissive of light having a wavelength of 1064 nm, and adhesive layer 141 is an optical adhesive that is greater than 90% transmissive of light having a wavelength of 1064 nm. The bottom electrode 156 is a PET-ITO film for which the bottom substrate 155 is formed from PET and the bottom electrically-conductive layer 150 is ITO. PET is approximately 90% transmissive of light having a wavelength of 1064 nm while ITO is approximately 70-80% transmissive of light at that wavelength.

In some embodiments, the electrically-conductive material of bottom electrically-conductive layer 150 comprises aluminum, and the light emitted by the segmenting laser 190 breaks the electrically-conductive material into discontinuous pieces, thereby breaking the conductive path between the segments of material on either side of the cut. In some embodiments, the electrically-conductive material of bottom electrically-conductive layer 150 comprises poly3,4-ethylenedioxythiophene (PEDOT) or a derivative thereof, and the areas of electrically-conductive material targeted by the light emitted by the segmenting laser 190 are rendered non-conductive by thermally changing the chemical composition of the electrically-conductive material. In some embodiments, the areas of electrically-conductive material targeted by the light emitted from the segmenting laser 190 are rendered non-conductive by thermal oxidation. In some embodiments, the electrically-conductive material of bottom electrically-conductive layer 150 comprises carbon nanotubes or carbon fiber. In some embodiments, the bottom substrate 155 comprises soda-lime glass.

Once a plurality of electrically-isolated segmented pixel electrodes 152 have been formed on the bottom electrically-conductive layer 150, kiss cutting and cleaning techniques are used to expose areas for forming electrical connections to each segmented pixel electrode 152. For example, a laser can be used to irradiate the first barrier layer, the first adhesive layer, the first substrate layer, and the first layer of light-transmissive electrically-conductive material at a second plurality of locations with a laser emitting light within a second range of wavelengths.

The kiss cutting technique is enabled by the use of a cutting laser 195 that emits light within a second range of wavelengths that are absorbed by the top barrier layer 160, adhesive layer 140, the top substrate 115, and the electrically-conductive material of the top electrically-conductive layer 110, and also absorbed by the bottom barrier layer 161, adhesive layer 141, the bottom substrate 155, and the electrically-conductive materials of the bottom electrically-conductive layer 150.

The cutting laser 195 emits light within a second range of wavelengths and irradiates the top barrier layer 160, adhesive layer 140, top substrate 115, and the top electrically-conductive layer 110. Each of these layers of the electro-optic display stack is substantially absorptive of light within the second range of wavelengths, and material from each of these layers is removed at each of the locations irradiated by cutting laser 195. As illustrated in FIG. 1, light emitted from the cutting laser 195 is used to make kiss cuts 180 by removing areas of the top barrier layer 160, adhesive layer 140, top substrate 115, and the top electrically-conductive layer 110 at locations corresponding to each segmented pixel electrode 152 formed on the bottom electrically-conductive layer 150. For example, each of the kiss cuts 180 can be vertically aligned with one of the segmented pixel electrodes 152.

Similarly, kiss cutting and cleaning techniques are used to expose an area for forming an electrical connection to the top electrically-conductive layer 110 at a location corresponding to the top electrically-conductive layer 150. For example, a laser can be used to irradiate the second barrier layer, the second adhesive layer, the second substrate layer, and the second layer of light-transmissive electrically-conductive material at a third plurality of locations with a laser emitting light within a third range of wavelengths. The cutting laser 195 emits light within a third range of wavelengths and irradiates the bottom barrier layer 161, adhesive layer 141, bottom substrate 155, and the bottom electrically-conductive layer 150. Each of these layers of the electro-optic display stack is substantially absorptive of light within the third range of wavelengths, and material from each of these layers is removed at each of the locations irradiated by cutting laser 195.

As illustrated in FIG. 1, light emitted from the cutting laser 195 is used to make kiss cut 181, removing areas of the bottom barrier layer 161, adhesive layer 141, bottom substrate 155, and the bottom electrically-conductive layer 150. In some embodiments, more than one kiss cut 181 is made to enable multiple electrical connections to be formed with the top electrically-conductive layer 110.

In an alternate embodiment, the top electrically-conductive layer 110 is partitioned into a number of electrically-isolated segments similar to the bottom electrically-conductive layer 150. For example, a second laser etching process can be used to form a plurality of electrically-isolated conductive segments on the first layer of light-transmissive electrically-conductive material by irradiating the first substrate layer, and the first layer of light-transmissive electrically-conductive material at a fourth plurality of locations with a laser emitting light within a fourth range of wavelengths. A segmenting laser that emits light within a fourth range of wavelengths can be used in an etching process that segments the top electrically-conductive layer 110 into an array or plurality of electrically-isolated conductive segments (not shown in FIG. 1).

This technique is enabled by the use of a segmenting laser (e.g., segmenting laser 190) that emits light within a range of wavelengths that pass through the top substrate 115, but are absorbed by the electrically-conductive material of top electrically-conductive layer 110. The segmenting laser irradiates the top substrate 115 and the top electrically-conductive layer 110. The top substrate 115 is substantially transmissive of light within the fourth range of wavelengths, and the light emitted from the segmenting laser passes through it, leaving the top substrate 115 substantially intact. Conversely, the top electrically-conductive layer 110 is substantially absorptive of light within the fourth range of wavelengths, and is therefore etched or cut by the segmenting laser, leaving an electrically-isolating void or cut at each of the locations at which the segmenting laser is focused.

In some embodiments, the electro-optic display stack also includes a first barrier layer such as top barrier layer 160 and a first adhesive layer such as adhesive layer 140. For this configuration of the display stack, the segmenting laser emits light within a range of wavelengths that pass through the top barrier layer 160, adhesive layer 140, and top substrate 115, but are absorbed by the electrically-conductive material of top electrically-conductive layer 110.

The segmenting laser irradiates the top barrier layer 160, adhesive layer 140, top substrate 115, and the top electrically-conductive layer 110. Of these layers, the top barrier layer 160, adhesive layer 140, and top substrate 115 are substantially transmissive of light within the fourth range of wavelengths. The light from the segmenting laser passes through the top barrier layer 160, adhesive layer 140, and top substrate 115, leaving these layers substantially intact. Only the top electrically-conductive layer 110 is substantially absorptive of light within the fourth range of wavelengths, and is therefore etched or cut by the segmenting laser, leaving an electrically-isolating void or cut at the locations at which the segmenting laser is focused (not shown in FIG. 1).

As denoted by the symbols for segmenting laser 190 and cutting laser 195 in FIG. 1, the cutting laser 195 emits light having a longer wavelength than the segmenting laser 190. In some embodiments, the cutting laser 195 emits light with a typical wavelength within the mid-infrared spectrum. In some embodiments, the cutting laser 195 is a carbon-dioxide laser ($CO_2$ laser) that emits light with a typical wavelength between about 9000 nm (9 μm) and about 12000 nm (12 μm). In some embodiments, the cutting laser 195 has an average output power of between about 20 W and about 200 W.

Building on the example above, the cutting laser 195 is a $CO_2$ laser (e.g., the $CO_2$ laser portion of a Speedy Flexx 400 laser system from Trotec Laser GmbH) that has an average output power of 100 W and emits light with a typical wavelength centered about approximately 10600 nm (10.6 μm). Further, the top barrier layer 160 and bottom barrier layer 161 are formed as sputtered aluminosilicate barrier films, and are approximately 0% transmissive of light having a wavelength of 10600 nm (10.6 μm), and adhesive layers 140 and 141 are an optical adhesive manufactured by Norland Products that is approximately 0% transmissive of light having a wavelength of 10600 nm (10.6 μm). The top electrode 116 and bottom electrode 156 are formed from a PET-ITO film for which the top substrate 115 and bottom substrate 155 are formed from PET and the top electrically-conductive layer 110 and bottom electrically-conductive layer 150 are ITO. PET and ITO are approximately 0% transmissive of light having a wavelength of 10600 nm (10.6 μm). Accordingly, the layers of display stack 100 are removed at the locations at which the cutting laser 195 is focused.

The same or a similar laser to cutting laser 195 is used to cut the display stack into pieces of the size needed to form individual displays for a particular application. For example, a cutting laser can be used to irradiate the electro-optic display stack at a fifth plurality of locations with a laser emitting light within a fifth range of wavelengths. All of the layers of the electro-optic display stack are substantially absorptive of light within the fifth range of wavelengths, and material from each of these layers is removed at each of the locations irradiated by the cutting laser.

For this cutting operation, instead of cutting through a subset of the layers (e.g., making a kiss cut), the laser cuts through the entirety of the display stack. Accordingly, a cutting laser can be used to cut several displays from a large sheet or roll of fully-formed display stack. The cutting operation can also be used to create displays having any number of shapes in addition to a conventional rectangular-shaped display.

In some embodiments, this cutting operation may be effected using die cutting, wet sawing, or scissor cutting. In some embodiments, this cutting operation is performed after segmenting the bottom electrically-conductive layer 150.

The process steps above are described with reference to several uniquely-identified ranges of wavelengths (e.g., a first range of wavelengths, a second range of wavelengths, a third range of wavelengths, etc.) in order to aid the reader's understanding of the invention. One of ordinary skill in the art will appreciate that two or more of the uniquely-identified ranges can comprise substantially similar wavelengths. As one example, in some embodiments the second range of wavelengths used to make kiss cuts 180 shown in FIG. 1 can comprise substantially similar wavelengths as the third range of wavelengths used to make kiss cut 181.

Figure 2:
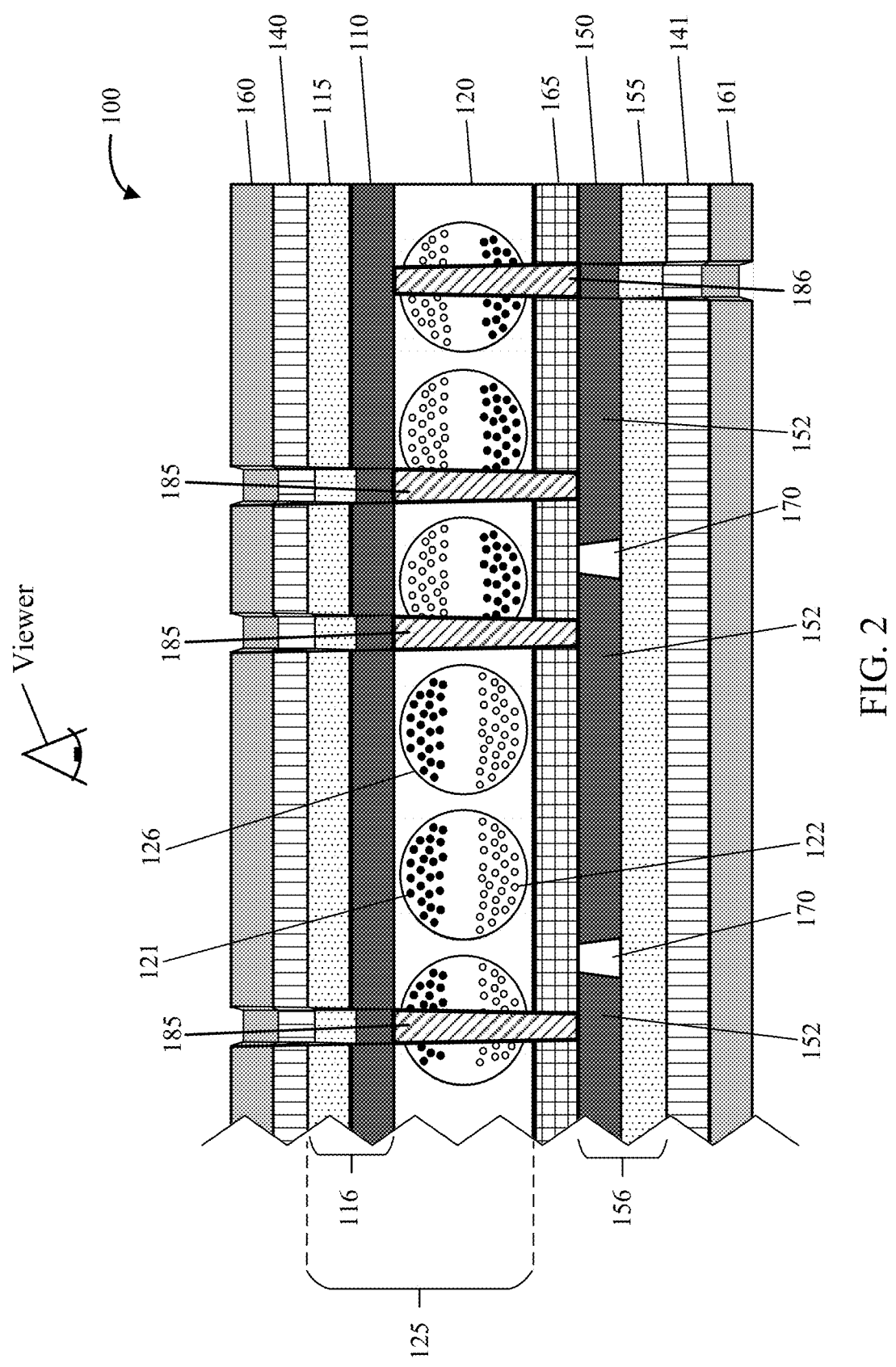
FIG. 2 is a cutaway view of a schematic cross-section showing an exemplary embodiment illustrating cleaning operations performed on a segmented electro-optic display stack in accordance with the subject matter presented herein.

Referring now to FIG. 2, after making kiss cuts 180, a cleaning process removes a plurality of volumes of the layer of an electro-optic material and the lamination adhesive layer adjacent to each of the second and third plurality of locations. For example, cleaning process 185 is performed to remove the residue of the layer of electrophoretic medium 120 and lamination adhesive 165 in order to expose electrical connections to each segmented pixel electrode 152. Likewise, cleaning process 186 is performed after making kiss cut 181 to remove the residue of the layer of electrophoretic medium 120 and lamination adhesive layer 165 in order to expose an electrical connection to the top electrically-conductive layer 110.

In some embodiments, cleaning process 185 and cleaning process 186 include mechanically or chemically removing the residue of the layer of electrophoretic medium 120 and lamination adhesive layer 165. In some embodiments, cleaning process 185 and cleaning process 186 include using deionized water and isopropanol to clean the exposed areas of electrically-conductive material on the top electrically-conductive layer 110 and bottom electrically-conductive layer 150.

After cleaning process 185 and cleaning process 186 have been performed, connectors can be attached to the exposed areas of electrically-conductive material on the top electrically-conductive layer 110 and bottom electrically-conductive layer 150 using typical "tails" with carbon-filled adhesive pads or silver filled epoxy, or any other suitable method for making an electrical connection.

In some embodiments, a sealing material having a low water vapor transmission rate (WVTR) is applied to the display stack 100 after the electrical connections have been made in order to seal any voids or holes that have been made in the layers of the display stack 100. (WVTR is a measure of the water vapor permeability of a given material, i.e., the mass of water vapor that passes through a given area of material at a specified temperature and humidity over a given period of time.) In some embodiments, the sealing material is a dispensed UV- or thermally-curable epoxy. In some embodiments, the sealing material is an adhesive-backed barrier tape that is wrapped from the top side of the display stack to the bottom side of the display stack along the edges. In some embodiments, the barrier tape is formed from materials having good barrier characteristics including a polymer (for example, a homopolymer such as polychlorotrifluoroethylene or similar materials) or sputtered ceramic on PET, PEN, PC, or other transparent plastic. In some embodiments, a seal such as those described in U.S. Pat. Nos. 6,982,178, 7,110,164, and 7,649,674 and Patent Publication No. 2004/0155857 is applied to the display stack 100 after the electrical connections have been made.

Figure 3:
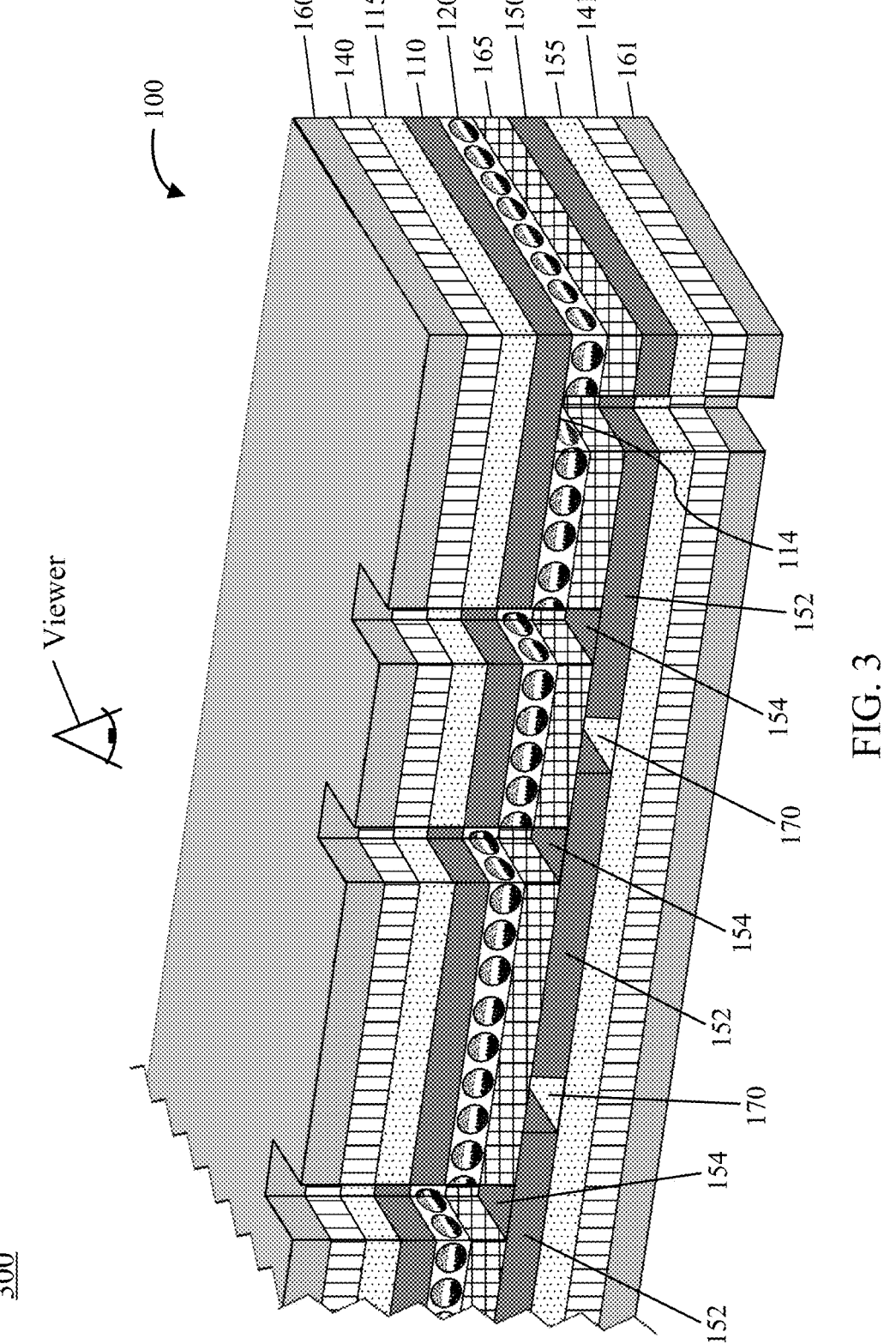
FIG. 3 is a cutaway perspective view of an exemplary segmented electro-optic display stack in accordance with the subject matter presented herein.

FIG. 3 is a cutaway perspective view 300 of an exemplary segmented electro-optic display stack 100 in accordance with the subject matter presented herein. View 300 shows display stack 100 after all segmenting, kiss cutting, and cleaning processes have been performed. As shown in FIG. 3, each segmented pixel electrode 152 has an exposed area 154 on the upper side (e.g., the viewing side) of the bottom electrically-conductive layer 150 for making an electrical connection to a controller or driver circuit. Similarly, the top electrically-conductive layer 110 has an exposed area 114 on the underside (e.g., opposite the viewing side) of the top electrically-conductive layer 110 for making an electrical connection to a controller or driver circuit.

Figure 4:
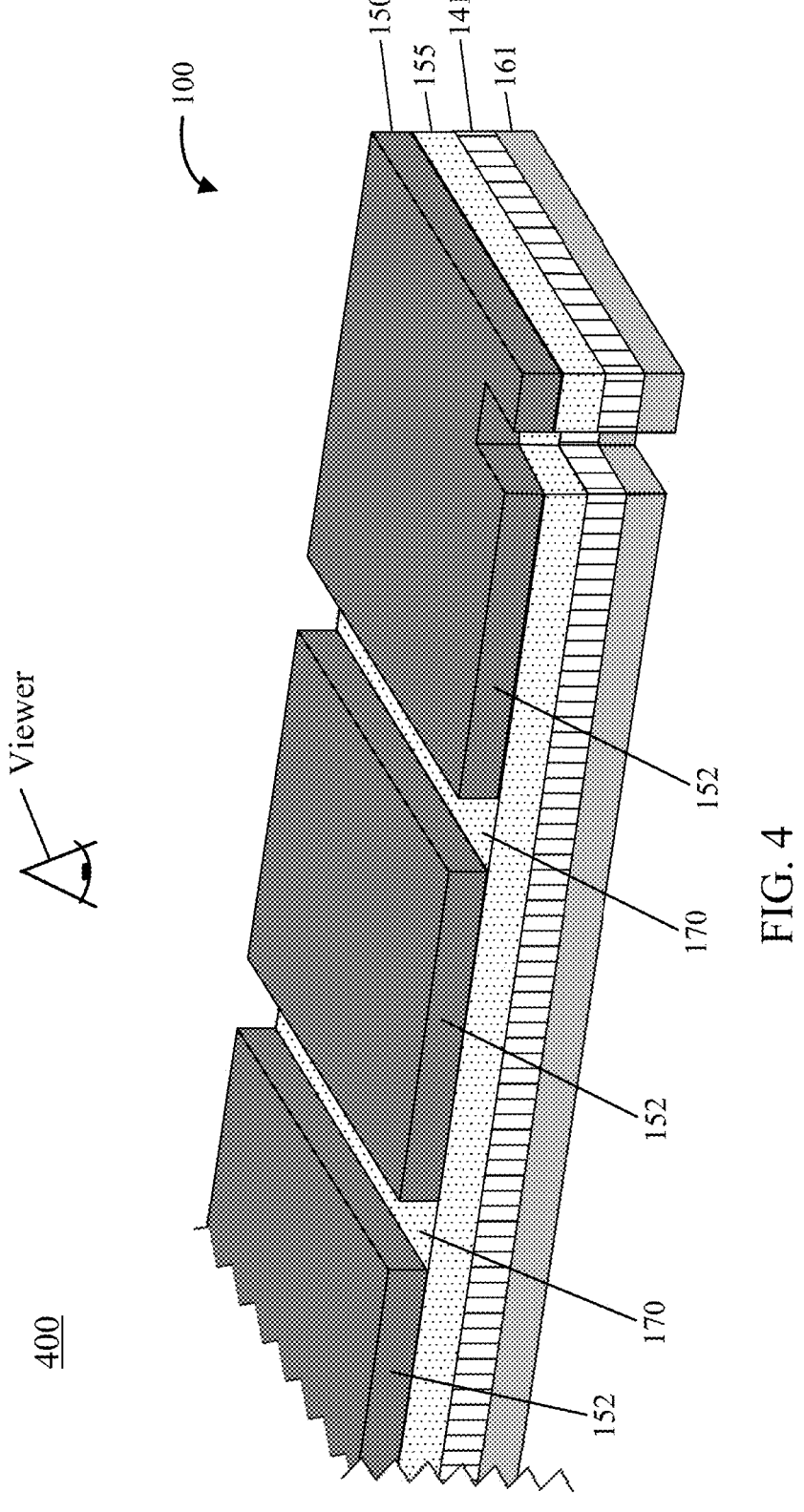
FIG. 4 is a partial cutaway perspective view of an exemplary segmented electro-optic display stack showing a segmented layer of electrically-conductive material in accordance with the subject matter presented herein.

FIG. 4 is a partial cutaway perspective view 400 of an exemplary segmented electro-optic display stack 100 showing a segmented layer of electrically-conductive material in accordance with the subject matter presented herein. View 400 shows only the bottom barrier layer 161, adhesive layer 141, bottom substrate 155, and the bottom electrically-conductive layer 150 after all segmenting, kiss cutting, and cleaning processes have been performed. The remaining layers of display stack 100 are obscured in view 400 in order to show the shape of each segmented pixel electrode 152 and the isolating cuts 170 between them.

Figure 5:
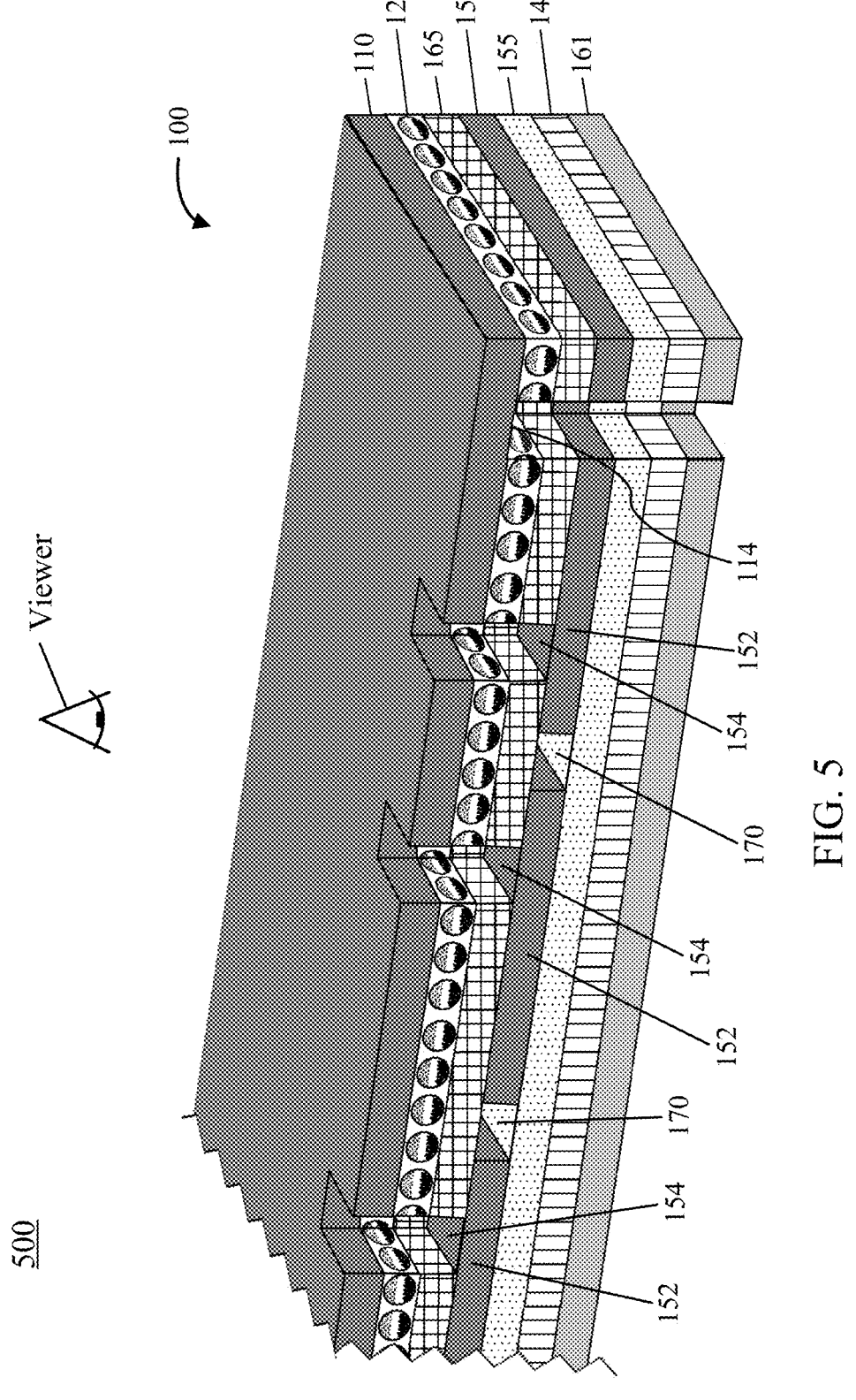
FIG. 5 is a partial cutaway perspective view of an exemplary segmented electro-optic display stack showing a continuous layer of electrically-conductive material in accordance with the subject matter presented herein.

FIG. 5 is a partial cutaway perspective view 500 of an exemplary segmented electro-optic display stack 100 showing a continuous layer of electrically-conductive material in accordance with the subject matter presented herein. View 500 shows the same layers as view 400, and additionally includes the layer of lamination adhesive 165, the layer of electrophoretic medium 120, and the top electrically-conductive layer 110. The other layers of display stack 100 are hidden in view 500 in order to show the shape of the continuous layer of electrically-conductive material on the top electrically-conductive layer 110.

Accordingly, the inventive process described herein enables the electrically-conductive layer(s) of a fully-assembled display stack to be partitioned into multiple electrically-isolated segments (e.g., pixel electrodes) without damaging the display stack's mechanical, optical, or barrier performance. Any number of segments and any variety of segment shapes or geometries can be etched into the conductors. Multiple electrical connections can also be made to segments to provide sufficient drive current, if needed. Multiple electrical connections can also be used to wave-switch segments, provided the segment aspect ratio is at least 2:1. Accordingly, the inventive process provides a means for producing custom segmented display devices using mass-produced laminated display stacks.

Further, if the display design requires an area to be switched independently but the area is not adjacent to an edge of the display stack, a kiss cut can be made at any point in the segmented pixel electrode area through the top layers to expose a contact point to the segmented pixel electrode. Advantageously, if the segmented pixel electrode material is transparent (e.g., ITO), the display can be designed to be viewed from the back side and the wire or other connection to the pixel electrode is positioned behind the display, out of sight of the viewer. In this case, only a small non-switching area at the point of the kiss cut is visible.

In addition, using the inventive process described herein, all lamination steps can be performed prior to cutting and cleaning processes. This enables the roll-to-roll lamination process to be optimized and reduces manufacturing time and cost. For example, all lamination operations can occur at the same facility in a clean setting from start to finish, thereby improving manufacturing yields by reducing defects caused by particulate contamination and changes in environmental conditions. Further, conditioning of the materials is required only once since a complete display stack, including barrier layers, can be assembled at the same time in a continuous, multi-stage roll-to-roll lamination process. Also, because the inventive process results in a fully-barriered display stack, there is no longer a period of delay between when an FPL is assembled and when it is eventually laminated to a backplane. As a result, edge seals can be applied at the time of, or immediately after, manufacture to prevent humidity changes that affect the performance of displays produced using conventional techniques, thereby increasing the useable area of each sheet or roll of finished display stack material.

One of skill in the art will appreciate that the inventive processes and techniques described herein are not limited to a specific display stack configuration, and can be used for processing several other display stack configurations. For example, in one embodiment, the inventive process is used on a partial display stack similar to display stack 100 in FIG. 1, but without the top and bottom barrier layers (160, 161) or adhesive layers (140, 141) applied. The segmenting laser (e.g., segmenting laser 190) can be used to segment one or both of the top and bottom electrically-conductive layers (110, 150), in the partial or full display stack configuration.

Further, the inventive process can be used on display stack components produced using conventional techniques. For example, the segmenting laser technique can be used to segment the electrically-conductive layer of a conventional FPL prior to being laminated a backplane. Likewise, the segmenting laser technique can be used to segment the electrically-conductive layer of a backplane into an array of pixel electrodes before an FPL is laminated on to it. Provided the total film stack between the segmenting laser source and the electrically-conductive material is thin, transparent at the wavelengths of light emitted by the segmenting laser, and clear enough for the laser to cut the materials, the electrically-conductive layer can still be segmented through numerous combinations of layers and other materials (e.g., release sheets).

In one embodiment of a display stack design for which segmenting is not required on both electrically-conductive layers, the barrier layer on non-etched side is made of a metal foil, such as an aluminum foil, as a lower cost alternative to a barrier layer formed from other materials (e.g., homopolymer, sputtered ceramic, flexible glass). In some embodiments, the substrate and barrier layer on one side (e.g., top, bottom) are opaque, and all segmenting is done through the transparent substrate and barrier layer of the other side of the display stack.

One of skill in the art will appreciate that this inventive technique can be applied to several different segmented display technologies, for example, segmented signage, variable transmission films, and architecture displays. This inventive technique can also be applied to polymer-dispersed liquid crystal (PDLC) displays which have been designed into several custom products such as smart windows and glass displays, and smart consumer electronics.

The electrode arrangements in the various types of display stacks of the present invention can be integrated into any of the types of displays described in the aforementioned E Ink and MIT patents and applications. Thus, for example, the displays may be of the direct drive type, in which the backplane is provided with a plurality of electrodes, each of which is provided with a separate connector by means of a controller that can control the voltage applied to the specific electrode. In such a direct drive display, a single continuous front electrode is usually provided covering the whole display, although other front electrode arrangements are possible. Depending upon the type of electro-optic material used, it may be possible to use a passive matrix drive arrangement in which (typically) the backplane carries a plurality of elongate parallel electrodes ("column electrodes"), while on the opposed side of the electro-optic material there is provided a plurality of elongate parallel electrodes ("row electrodes") running at right angles to the column electrodes, the overlap between one specific column electrode and one specific row electrode defining one pixel of the display. The present displays may also be of the active matrix type, typically with a single continuous front electrode covering the whole display and a matrix of pixel electrodes on the backplane, each pixel electrode defining one pixel of the display and having an associated transistor or other non-linear element, the active matrix display being scanned in the conventional manner to write the display in a row-by-row fashion. Finally, the present display may also be of the stylus-driven type with (typically) a single electrode on the backplane and no permanent front electrode, writing of the display being effected by moving a stylus across the front surface of the display.

The display stacks of the present invention may be used in any application in which prior art electro-optic display stacks have been used. Thus, for example, the present display stacks may be incorporated into electronic book readers, portable computers, tablet computers, cellular telephones, smart cards, signs, watches, shelf labels and flash drives.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of manufacturing a segmented electro-optic display, the method comprising:
   providing an electro-optic display stack comprising:
      a first substrate layer;
      a first layer of light-transmissive electrically-conductive material;
      a layer of an electro-optic material;
      a lamination adhesive layer;
      a second layer of light-transmissive electrically-conductive material; and
      a second substrate layer;
   forming a plurality of electrically-isolated conductive segments on the second layer of light-transmissive electrically-conductive material using a laser etching process, the laser etching process comprising:
      irradiating the second substrate layer and the second layer of light-transmissive electrically-conductive material at a plurality of locations with a laser emitting light within a first range of wavelengths,
         wherein the second substrate layer is substantially transmissive of light within the first range of wavelengths, and the light-transmissive electrically-conductive material of the second layer of light-transmissive electrically-conductive material is substantially absorptive of light within the first range of wavelengths, and
      wherein, at each of the plurality of locations:
         the second substrate layer substantially transmits the light within the first range of wavelengths, and
         the light-transmissive electrically-conductive material of the second layer of light-transmissive electrically-conductive material substantially absorbs the light within the first range of wavelengths and is removed.

2. The method of claim 1 wherein the electro-optic display stack further comprises a first barrier layer, a first adhesive layer, a second adhesive layer, and a second barrier layer.

3. The method of claim 2 wherein the laser etching process further comprises irradiating the second adhesive layer and the second barrier layer at the plurality of locations with the laser emitting light within the first range of wavelengths, wherein the second adhesive layer and the second barrier layer are substantially transmissive of light within the first range of wavelengths, and wherein, at each of the plurality of locations, the second adhesive layer and the second barrier layer substantially transmit the light within the first range of wavelengths.

4. The method of claim 3 further comprising:

irradiating the first barrier layer, the first adhesive layer, the first substrate layer, and the first layer of light-transmissive electrically-conductive material at a second plurality of locations with a laser emitting light within a second range of wavelengths, wherein the first barrier layer, the first adhesive layer, the first substrate layer, and the light-transmissive electrically-conductive material of the first layer of light-transmissive electrically-conductive material are substantially absorptive of light within the second range of wavelengths, and wherein, at each of the second plurality of locations, the first barrier layer, the first adhesive layer, the first substrate layer and the light-transmissive electrically-conductive material of the first layer of light-transmissive electrically-conductive material substantially absorb the light within the second range of wavelengths and are removed; and removing a plurality of volumes of the layer of an electro-optic material and the lamination adhesive layer adjacent to each of the second plurality of locations.

5. The method of claim 3 further comprising:

irradiating the second barrier layer, the second adhesive layer, and the second substrate layer and the second layer of light-transmissive electrically-conductive material at a third plurality of locations with a laser emitting light within a third range of wavelengths, wherein the second barrier layer, the second adhesive layer, and the second substrate layer and the light-transmissive electrically-conductive material of the second layer of light-transmissive electrically-conductive material are substantially absorptive of light within the third range of wavelengths, and wherein, at each of the third plurality of locations, the second barrier layer, the second adhesive layer, and the second substrate layer and the light-transmissive electrically-conductive material of the second layer of light-transmissive electrically-conductive material substantially absorb the light within the third range of wavelengths and are removed; and removing a plurality of volumes of the layer of an electro-optic material and the lamination adhesive layer adjacent to each of the third plurality of locations.

6. The method of claim 1 further comprising:

forming a plurality of electrically-isolated conductive segments on the first layer of light-transmissive electrically-conductive material using a second laser etching process, the second laser etching process comprising:

irradiating the first substrate layer, and the first layer of light-transmissive electrically-conductive material at a fourth plurality of locations with a laser emitting light within a fourth range of wavelengths, wherein the first substrate layer is substantially transmissive of light within the fourth range of wavelengths, and the light-transmissive electrically-conductive material of the first layer of light-transmissive electrically-conductive material is substantially absorptive of light within the fourth range of wavelengths, and wherein, at each location:

the first substrate layer substantially transmits the light within the first range of wavelengths, and the light-transmissive electrically-conductive material of the first layer of light-transmissive electrically-conductive material substantially absorbs the light within the fourth range of wavelengths and is removed.

7. The method of claim 6 wherein the electro-optic display stack further comprises a first barrier layer and a first adhesive layer.

8. The method of claim 7 wherein the second laser etching process further comprises irradiating the first adhesive layer and the first barrier layer at the fourth plurality of locations with the laser emitting light within the fourth range of wavelengths, wherein the first adhesive layer and the first barrier layer are substantially transmissive of light within the fourth range of wavelengths, and wherein, at each of the plurality of locations, the first adhesive layer and the first barrier layer substantially transmit the light within the fourth range of wavelengths.

9. The method of claim 8 further comprising:

irradiating the electro-optic display stack at a fifth plurality of locations with a laser emitting light within a fifth range of wavelengths, wherein each layer of the electro-optic display stack is substantially absorptive of light within the fifth range of wavelengths, and wherein, at each of the fifth plurality of locations, the layers of the electro-optic display stack substantially absorb the light within the fifth range of wavelengths and are removed.

10. A segmented electro-optic display formed using the method of claim 1.

11. The method of claim 1 wherein the first range of wavelengths is between 940 nm and 1440 nm.

12. The method of claim 4 wherein the second range of wavelengths is between 9000 nm and 12000 nm.

13. The method of claim 5 wherein the third range of wavelengths is between 9000 nm and 12000 nm.

14. The method of claim 6 wherein the fourth range of wavelengths is between 940 nm and 1440 nm.

15. The method of claim 9 wherein the fifth range of wavelengths is between 9000 nm and 12000 nm.

16. The method of claim 3 wherein the second barrier layer, the second adhesive layer, and the second substrate layer are 85% or more transmissive of light within the first range of wavelengths.

17. The method of claim 1 wherein the light-transmissive electrically-conductive material of the second layer of light-transmissive electrically-conductive material is 80% or less transmissive of light within the first range of wavelengths.

18. The method of claim 1 wherein the light within the first range of wavelengths breaks the light-transmissive electrically-conductive material of the second layer of light- transmissive electrically-conductive material into discontinuous pieces at each of the plurality of locations.

19. The method of claim 1 wherein the light within the first range of wavelengths oxidizes the light-transmissive electrically-conductive material of the second layer of light- transmissive electrically-conductive material into discontinuous pieces at each of the plurality of locations.

20. The method of claim 1 wherein the laser emitting light in the first range of wavelengths is a YAG or Ytterbium doped fiber laser.

21. The method of claim 4 wherein the laser emitting light in the second range of wavelengths is a $CO_2$ laser.

22. The method of claim 4 wherein the plurality of volumes of the layer of an electro-optic material and the lamination adhesive layer are removed using deionized water and isopropanol.

\* \* \* \* \*